（12）United States Patent
Ravi

(10) Patent No.: US 11,511,337 B2
(45) Date of Patent: Nov. 29, 2022

(54) SINGULATED LIQUID METAL DROPLET GENERATOR

(71) Applicant: Crystal Technologies LLC, San Jose, CA (US)

(72) Inventor: Tirunelveli Subramaniam Ravi, San Jose, CA (US)

(73) Assignee: CRYSTAL TECHNOLOGIES LLC, San Jose, CA (US)

( * ) Notice: Subject to any disclaimer, the term of this patent is extended or adjusted under 35 U.S.C. 154(b) by 0 days.

(21) Appl. No.: 17/139,832

(22) Filed: Dec. 31, 2020

(65) Prior Publication Data

US 2021/0197254 A1    Jul. 1, 2021

Related U.S. Application Data

(60) Provisional application No. 62/956,021, filed on Dec. 31, 2019.

(51) Int. Cl.
| | | |
|---|---|---|
| *B22D 41/50* | (2006.01) | |
| *B22F 9/08* | (2006.01) | |
| *B22D 39/00* | (2006.01) | |

(52) U.S. Cl.
CPC .......... *B22D 41/50* (2013.01); *B22D 39/003* (2013.01); *B22F 9/082* (2013.01); *B22F 2009/0892* (2013.01)

(58) Field of Classification Search
None
See application file for complete search history.

(56) References Cited

U.S. PATENT DOCUMENTS

| | | | |
|---|---|---|---|
| 4,689,074 A | | 8/1987 | Seaman et al. |
| 4,762,553 A | * | 8/1988 | Savage ............... B22F 9/08 |
| | | | 425/10 |
| 4,869,936 A | | 9/1989 | Moskowitz et al. |
| 5,560,543 A | | 10/1996 | Smith et al. |

(Continued)

FOREIGN PATENT DOCUMENTS

JP        3107404 A2    5/1991

OTHER PUBLICATIONS

Patent Cooperation Treaty, International Search Report issued in PCT/US2020/067739, dated Mar. 22, 2021, pp. 1-2.

*Primary Examiner* — Scott R Kastler
(74) *Attorney, Agent, or Firm* — Pillsbury Winthrop Shaw Pittman LLP

(57) ABSTRACT

This disclosure pertains to a system, methods, and apparatus configured for generating singulated metal droplets and collecting powder metal. The system comprises crucible apparatus each including a crucible housing, a gas inlet, and an alloy nozzle. The crucible housing is operatively coupled to an induction heating element and power supply to provide induction heating of the crucible housing and electromagnetically levitate a mass of molten metal. The gas inlet is operatively coupled to a gas supply and configured to receive a pressurized gas pulse via the gas supply, the pressurized gas pulse being directed at the mass of molten metal. The alloy nozzle is configured to release a metal droplet singulated from the mass of molten level due to the pressurized gas pulse. The system includes a powder collection unit configured to collect powder from one or more dispensing channel configured to catch the falling singulated liquid metal droplet.

31 Claims, 11 Drawing Sheets

(56) References Cited

U.S. PATENT DOCUMENTS

| | | |
|---|---|---|
| 5,609,919 A | 3/1997 | Yuan et al. |
| 6,045,056 A | 4/2000 | Tardoni |
| 6,144,690 A | 11/2000 | Kusamichi et al. |
| 2014/0093658 A1* | 4/2014 | Zhao .................... B23K 3/0607 427/595 |
| 2014/0339219 A1 | 11/2014 | Ignatowski et al. |
| 2016/0030856 A1 | 2/2016 | Kaplan et al. |
| 2017/0102185 A1* | 4/2017 | Sakuma .............. B22D 11/0611 |

* cited by examiner

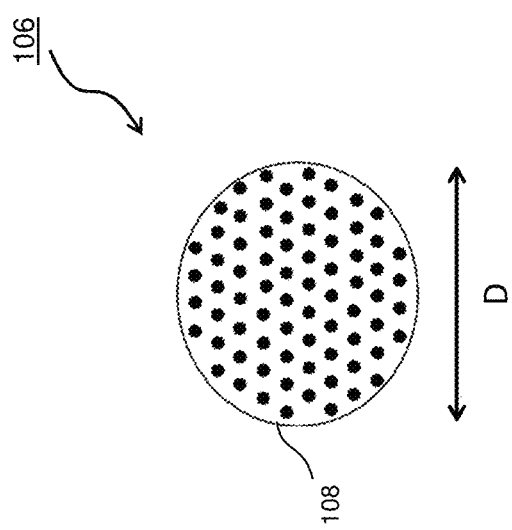

SINGULATED LIQUID METAL DROPLET GENERATOR

FIELD OF THE INVENTION

The present invention relates generally to an apparatus, systems, and methods for a singulated liquid metal droplet generator for generating metal powders suitable for additive manufacturing.

BACKGROUND

Additive manufacturing (AM) of metals has, in recent years, seen significant growth due to its ability to rapidly prototype complex parts. Of the metals AM market, titanium alloy parts have seen the most rapid increase due to their increasing use in orthopedic and dental implants as well as high strength but low weight aircraft parts to minimize the so-called "buy to fly" ratio. The AM equipment is usually an automated system where the part is built up layer by layer using selective melting of the raw material powder (or wire) by a heat source such as a laser, an e-beam or a plasma. Due to the low throughput of these systems, the biggest cost factor of AM manufactured parts is the amortization of the equipment itself. A close second in cost is the raw material for such 3D printing tools; generally, the raw material is a powder with spherical particles with a wide size distribution.

SUMMARY OF THE INVENTION

The present invention relates generally to an apparatus corresponding to a singulated liquid metal droplet generator and systems and methods for generating metal powders suitable for additive manufacturing.

In one aspect, this invention is a system and a process for droplet generation for high temperature reactive liquid metals such as titanium alloys, as described herein. In another aspect, it is a system and a process for precisely-sized, spherical metal powder generation for titanium alloys and other high temperature metals and ceramics, as described herein. In aspects of the invention, the system may consist of multiple cooled crucibles of liquid droplet generators powered by an external induction power source and a powder collection mechanism that allows the liquid metal to cool into precisely sized spheres. Some aspects of the invention include methods for fabricating component parts of the crucible, such as the droplet formation nozzle, as described herein.

In some embodiments, a crucible apparatus for generating singulated liquid metal droplets includes a crucible housing operationally coupled to a plurality of coils. The coils are configured to generate heat to provide induction heating of the crucible housing and electromagnetically levitate a mass of molten metal. The crucible includes a gas inlet configured to receive a pressurized gas pulse; the pressurized gas pulse being directed at the mass of molten metal. In some embodiments, an alloy nozzle is configured to release a singulated liquid metal droplet singulated from the mass of molten level due to the pressurized gas pulse directed at the mass of molten metal.

In some embodiments, a method for generating singulated liquid metal droplets utilizes a crucible having a gas inlet, a plurality of coils, and an alloy nozzle. The method comprising providing a mass of metal wire into the crucible and inductively heating, utilizing the plurality of coils, the crucible thereby melting the mass of metal wire and electromagnetically levitating the mass of molten metal. In some embodiments, the method includes providing a pressurized gas pulse into the mass of molten metal via a gas inlet of the crucible and simultaneously lowering the levitation force thereby pushing out a singulated liquid metal droplet from the alloy nozzle.

In some embodiments, a system for generating singulated metal droplets and collecting powder metal includes one or more crucible apparatus. The one or more crucible apparatus comprise a crucible housing operatively coupled to induction heating coils. The coils are configured to generate heat to provide induction heating of the crucible housing and electromagnetically levitate a mass of molten metal for ejecting a singulated liquid metal droplet via an alloy nozzle. In some embodiments, the system includes an induction power supply coupled to the induction heating coils and configured to supply power for inductive heating. In some embodiments, the system includes a gas supply configured to provide a pressurized gas corresponding to the pressurized gas pulse. In some embodiments, the system includes a gas chamber containing the one or more crucibles apparatus. In some embodiments, the system includes one or more dispensing channels corresponding to the one or more crucible apparatus and a powder collection unit configured to collect powder corresponding to the singulated liquid metal droplet from the dispensing channel.

These and other aspects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIGS. 1A-1F are schematic representations of a crucible apparatus and precisely formed nozzles for use in singulated liquid metal droplet generator system, in accordance with one or more embodiments of the present invention;

DETAILED DESCRIPTION

Figure 1A:
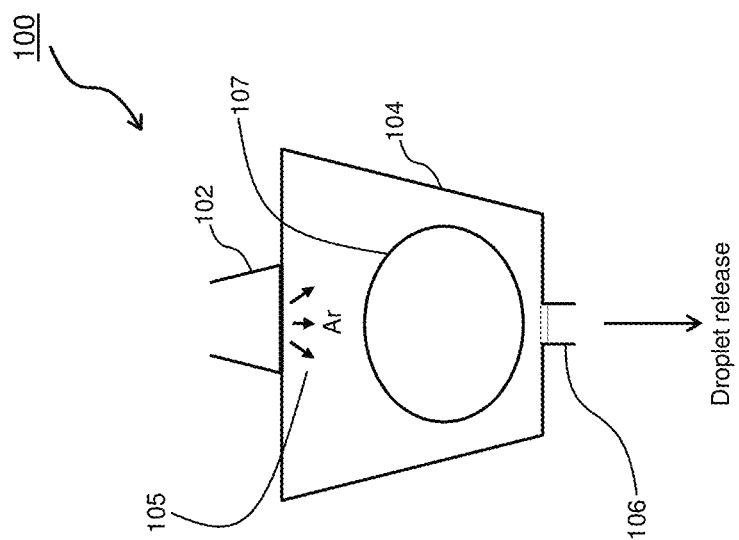

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. The elements shown in the drawings and are not limiting upon the claims unless expressly recited therein. Directional phrases used herein, such as, for example and without limitation, top, bottom, left, right, upper, lower, front, back, and derivatives thereof, relate to the orientation of the figures and are not meant to be limiting.

Moreover, where certain elements of the present invention can be partially or fully implemented using known components, only those portions of such known components that are necessary for an understanding of the present invention will be described, and detailed descriptions of other portions of such known components will be omitted so as not to obscure the invention.

As used herein, the singular form of "a", "an", and "the" include plural references unless the context clearly dictates otherwise. As used herein, the statement that two or more parts or components are "coupled" shall mean that the parts are joined or operate together either directly or indirectly (i.e., through one or more intermediate parts or components, so long as a link occurs). As used herein, "directly coupled" means that two elements are directly in contact with each other. As used herein, "fixedly coupled" or "fixed" means that two components are coupled so as to move as one while maintaining a constant orientation relative to each other. As used herein, "operatively coupled" means that two elements are coupled in such a way that the two elements function together. It is to be understood that two elements "operatively coupled" does not require a direct connection or a permanent connection between them. As utilized herein the term "about", "substantially", or "approximately" shall mean the difference is negligible.

Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Methods, systems, and apparatus described herein correspond to a singulated liquid metal droplet generator utilized for the additive manufacturing of metal powder. Conventional methods of manufacturing metal powder for AM involve either gas or plasma atomization of a large batch of molten metal alloy. While one can get generally pure spherical particles, this conventional process has been known to have many issues. For example, the particles have a wide size distribution, which necessitates significant post sieving to narrow down the distribution. Typical final size distributions for selective laser melting AM range from 20 to 50 microns and for e-beam melting AM range from 50 to 100 microns.

However, ideally, the mix of spherical powder sizes that give maximum final density needs to be a bimodal distribution with the size and the ratio of the amounts of powder being determined by the interstitial voids in a close packed scenario. See, for example, *Production of Gas Atomized Ti Alloy Powder by Levitation Melting Furnace with Electro Magnetic Nozzle*, T. Okumura, T. Shibatal, N. Okochi, Ti-2007 Science and Technology, edited by M. Ninomi, S. Akiyama, M. Ikeda, M. Hagiwara, K. Maruyama, The Japan Institute of Metals (2007). The flowability (the ability to spread easily) is also determined by the sphericity of the powders. Thus, it is important to have spherical powders of known distribution to create a close packing density.

Because batches of AM powders typically have satellite particles, the atomization step of powder manufacturing can result in small particles that attach themselves to the larger particles, which, when formed into 3D parts, may result in a lower density than desired. This may also result in voids in the finished part. These voids may reduce mechanical strength and may be sources of crack initiation in fatigue. Also problematic, there can be gas voids formed in the particles. Given the hypersonic nature of the Ar gas impingement on the molten metal, there is a chance that Ar gas bubbles can be trapped in the metal particles which results in voids in the finished AM part. These voids are the primary source of mechanical failures by fatigue.

Moreover, utilizing traditional techniques, the cost of AM powders is high resulting from the low yield of smaller particles (below 50 microns) in the powder generation process; the cost of the powder can be at least 3-4 times the cost of the alloy in wire form. For example, typical Ti-6-4 alloy wire is $50/kg, whereas Ti alloy powder for AM is $200-$300/kg Accordingly, systems, methods, and apparatus in accordance with the embodiments described herein improve the alloy powder generation part of the metal AM manufacturing process while achieving substantially full miscibility in small-scale alloy generation. As utilized herein, full miscibility is a property of two metals to mix in all proportions (i.e., to fully dissolve in each other at a desired target concentration), forming a homogeneous solution. Substantially full means the difference is negligible. Full miscibility provides increased strength and durability for 3D printing applications. For example, to generate better alloy powders for AM with one or more of known particle sizes, no satellites, reduced need for post particle generation sieving and a repeatable bimodal or multimodal size distribution.

Precisely sized high purity speherical powders are essential for emerging 3D printing applications. Utilizing the apparatus, systems, and methods described below provide the capability for manufacturing custom alloys that need to be made in small quantities. For example, Nitnol is approximately 51% Ni-49% Ti and it has the unique property of being a shape memory alloy. Nitinol is not only increasingly being used in medical applications such as stents, but is also being considered for porous orthopedic implants due its mechanical compatibility with the porous human bone structure. However, even in the wire form when manufactured conventionally, nitinol results is very expensive (e.g., $700/kg).

Accordingly, some embodiments described herein may be implemented for measuring precise amounts of Nickel and Titanium as feed wires and then inductively melting and levitating small amounts (e.g., less than 100 grams) of Ni/Ti which can be manufactured at exceedingly low cost by implementing the embodiments described herein, which is described in further detail below. Having such small quantities will enable full miscibility of the individual elements to form the Nitinol Alloy without the danger of contamination or Nickel and Titanium precipitation.

Figure 1C:
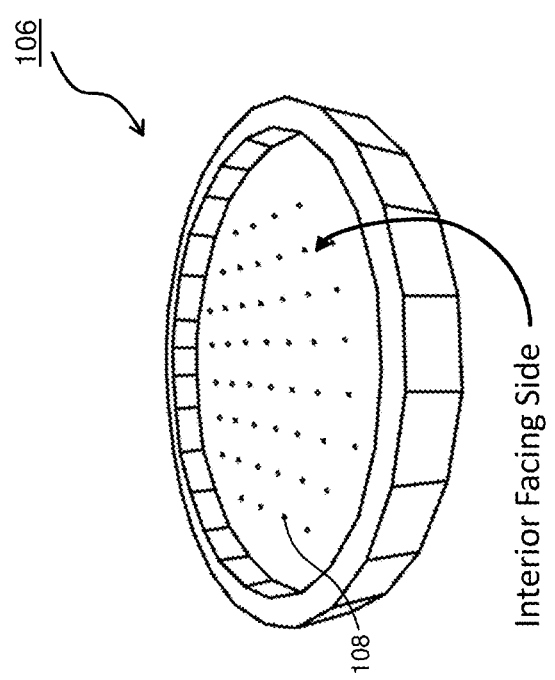

Referring now to FIGS. 1A-1C, FIGS. 1A, 1B & 1C provide a schematic representation of a high level overview of an apparatus 100 configured for using pressure-pulsing to push through liquid metal in precisely formed nozzles in small crucibles (e.g., crucible 100), according to some embodiments of the present invention.

FIG. 1A shows a vertical cross-section of crucible 100, which in embodiments has a conical shape. As shown in FIG. 1A, crucible 100 may include gas inlet 102, crucible housing 104, alloy nozzle 106, and levitated molten metal 107. As shown in FIG. 1A, gas inlet 102 is configured to provide gas pulse 105. Crucible housing may comprise a small scale copper crucibles configured to contain 100 g or less of levitated molten metal 107. In some embodiments, crucible housing 104 may be configured to contain 50 g or less of levitated molten metal 107. In other embodiments, crucible housing 104 may be configured to contain 100 g or more of levitated molten metal 107.

In some embodiments, levitated molten metal 107 may include a titanium alloy, which is electromagnetically levitated while being heated in crucible 100. In some embodiments, molten metal 107 may include Ti-6-4, which may be cut into wire bits and fed into crucible 105 via a wire feeder apparatus (not shown). Once inserted into crucible housing 104, an electric current is generated inside crucible housing 104 causing the Ti-6-4 to electromagnetically levitate inside crucible housing 104. The levitation keeps molten metal 107 from touching the interior walls of crucible 100. Discussed in further detail below, an electric current, required for electromagnetically levitating the molten metal and for induction heating crucible housing 104, is facilitated by an induction heating power supply (shown in FIG. 4) configured with coils that are operatively coupled to crucible housing 104 to implement an induction heating process.

To generate metal droplets, inert gas pulse 105 is applied, as indicated in FIG. 1A, to push molten metal 107 onto alloy nozzle 106, thus releasing droplets of controlled size from alloy nozzle 106. In some embodiments, inert gas pulse 105 may include a noble gas such as argon. Gas pulse 105 is kept sufficiently short to avoid damage of alloy nozzle 106 by the molten metal droplet. For example, gas pulse 105 may comprise a 70 psi pulse. The frequency of gas pulses 105 will determine the output of droplets, which is discussed in further detail below.

FIG. 1B shows a schematic top-side view of alloy nozzle 106 having an entry inlet which comprises round holes 108 for forming the droplets. In some embodiments, nozzle 106 entry inlet may include gas flow channels configured to assist in the levitation of molten metal 107, which is discussed in further detail below. Alloy nozzle 106 includes diameter D. In the embodiment shown, holes 108 are about 100 microns in diameter and alloy nozzle 106 is about 10 mm in diameter, although these dimensions can be varied depending on the desired droplet size and rate of droplet generation, etc., which is discussed in further detail below. In some embodiments, nozzle 106 may include holes 108 having holes of varying diameter. In some embodiments, nozzle 106 may include a diameter of more or less than 10 mm. For example, in some embodiments, nozzle 106 may include a diameter of 8 mm, 12 mm, and/or 14 mm)

FIG. 1C shows a representation of a top view (top side facing the liquid metal sphere) of alloy nozzle 106 of FIG. 1B. As discussed above, there are a number of challenges for implementing the method of droplet formation for high temperature alloys such as Ti-6-4 (melting temperature ~1670° C.). No known ceramic or refractory metal can withstand contact with liquid titanium for any significant period of time. This makes the design of alloy nozzle 106 material a key factor in implementing such a method. Multiple small crucibles 106, which is part of a system design for some embodiments of the present invention (e.g., FIG. 4), need to be effectively heat-sinked. The whole particle production system (e.g., system 400) has to be kept in an inert atmosphere to prevent contamination of the metal droplets. The systems and methods according to some embodiments of the present invention address these challenges, as described in detail below.

Figure 1D:
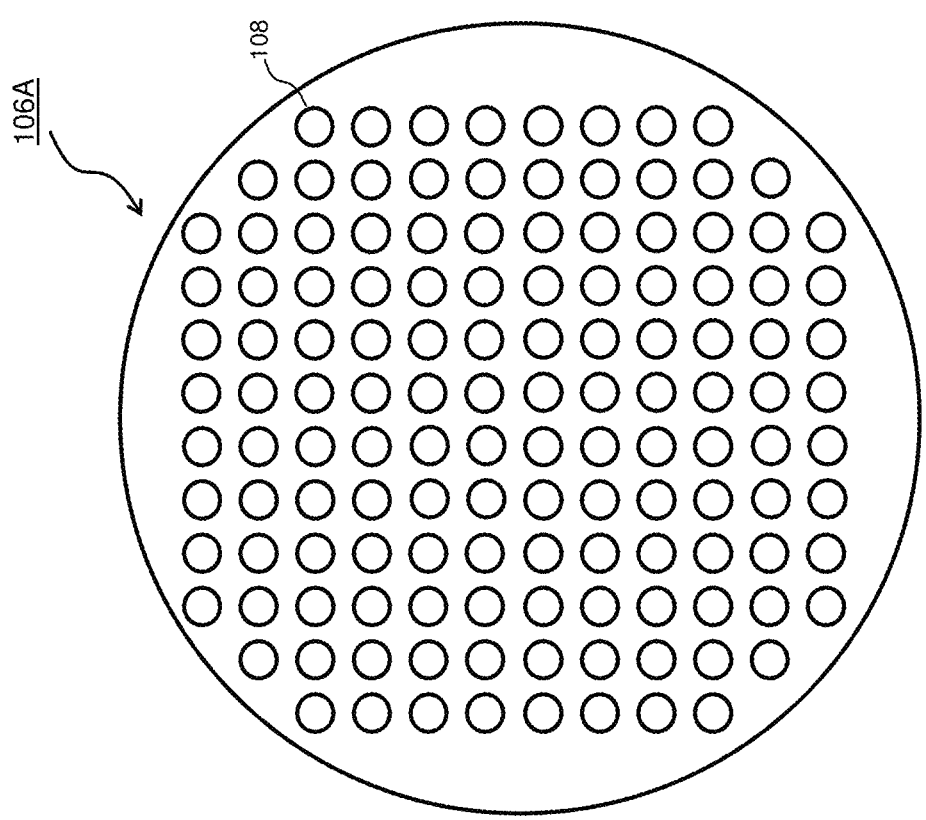
Figure 1E:
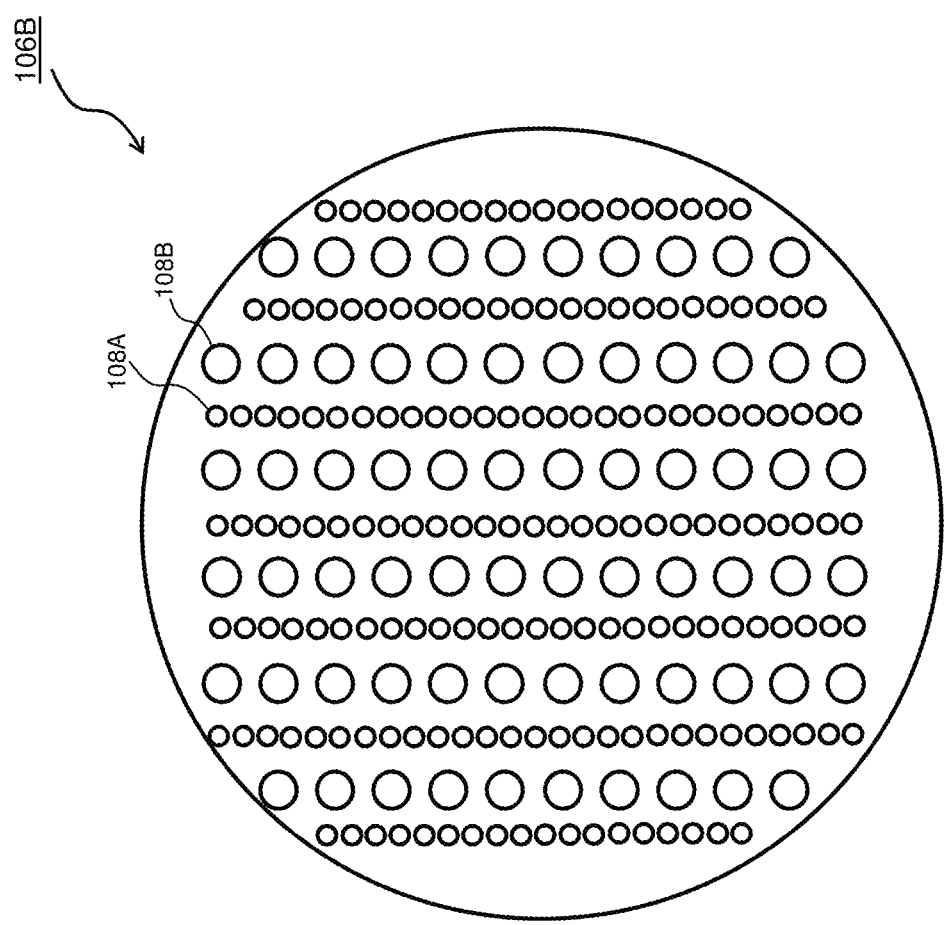
Figure 1F:
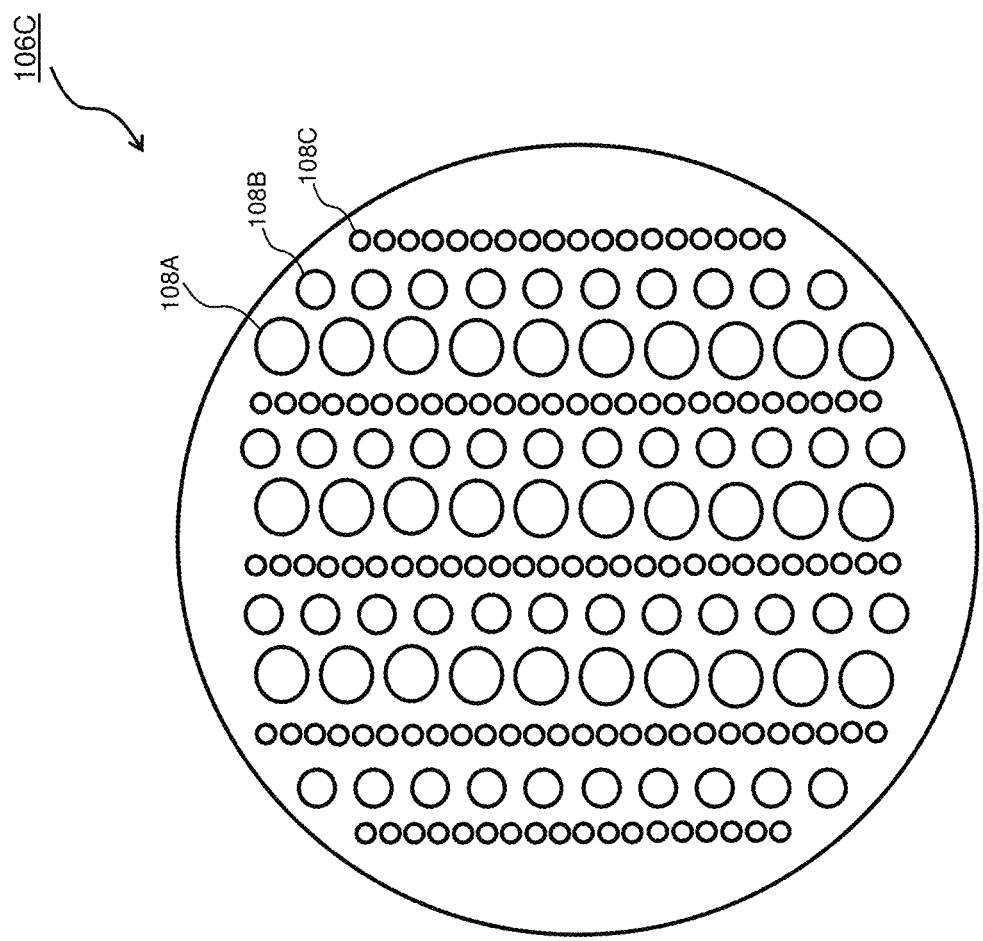

FIGS. 1D-1F show a top view of alloy nozzle 106A-106C, respectively, in accordance with some embodiments described herein. Nozzles 106A-106C include entry inlets having holes 108 that are customized for the target droplet sizes and droplet size distribution control. FIG. 1B depicts nozzle 106A having a single sized droplet based on the size of holes 108A. For example, holes 108A may be 100 microns in diameter. In some embodiments, various size distribution of droplets may be achieved by modifying holes 108 with the desired size distribution.

For example, FIG. 1D depicts a top view of nozzle 106B having holes 108A-108B configured for bimodal distribution. Bimodal distribution will provide for droplets that form with two size distributions. For example, based on a desired outcome of having a bimodal distribution of 70% of 20 microns and 30% of 50 microns nozzle 106 may be fabricated to reflect precisely that, as shown in FIG. 1D.

FIG. 1F depicts a top view of nozzle 106C configure for trimodal distribution of holes 108A-108C, which, in some embodiments, may be of varied sizes. For example, trimodal distribution may include 60% of 20 microns 25% of 50 microns and 15% of 100 microns. Other size configurations and multimodal distributions may be achieved and have been fully contemplated herein. Moreover, the state of the art electrostatic machining tools can be used for precise nozzle hole manufacturing.

Figure 2:
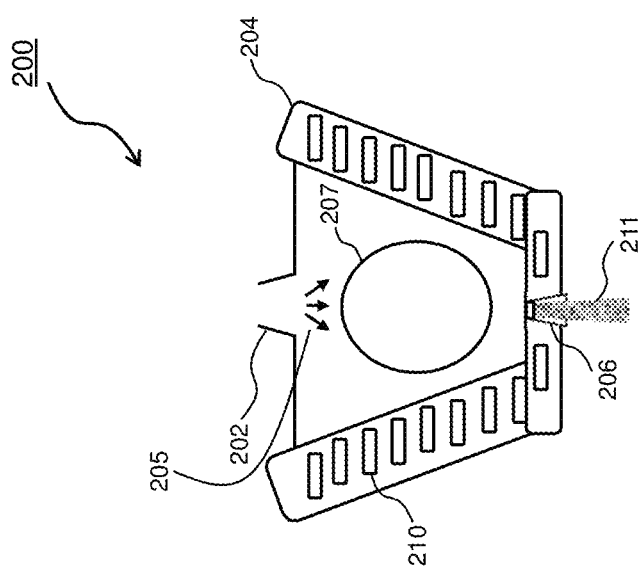
FIG. 2 is a vertical cross-sectional view of a metal alloy melt in a crucible apparatus for use in singulated liquid metal droplet generator system, in accordance with one or more embodiments of the present invention.

Referring now to FIG. 2, FIG. 2 depicts crucible apparatus 200, crucible apparatus 200 is an exemplary embodiment of crucible apparatus 100, in which similarly labeled numbers correspond to similar parts having similar functionality. In some embodiments crucible 200 serves one or more of the following functions: provides inductively coupled heat to the metal wire compact (e.g., titanium wire compact), provides a hermetically sealed chamber for the argon pressure pulsing, and couples to a custom alloy nozzle for singular alloy droplet formation.

In some embodiments, crucible 200 may be formed of copper, as traditionally used for induction skull melting of titanium, but may be fabricated on a smaller scale than currently used in induction skull melting. In some embodiments, multiple small crucibles may be utilized each holding only 50-100 g of molten titanium. In some embodiments each crucible 200 may hold up to 500 g of molten metal.

As shown in FIG. 2, crucible 200 may be fabricated with built-in water-cooling channels 210 to cool crucible 200. Water-cooling channels 210 may remove excess heat from crucible housing 204. Water flow channels 210 efficiently extract the heat radiated from the ~1700° C. molten Titanium to keep the crucible (e.g., a copper crucible) well below its melting temperature.

In some embodiments, induction heating crucible 200 may include one or more of the following features. For example, an induction power required to melt 50-100 g of Ti is around 3-5 kW. For amounts of the order of 50-100 gms, this type of induction power is sufficient to also levitate molten titanium 207.

In some embodiments, argon (Ar) pressure pulsing is used to periodically push the molten liquid through alloy nozzle 206 to form singulated droplets 209. A closed loop noble gas (e.g., argon) system is attached to crucible 200 and pressure pulses can be generated using a solenoid valve (not shown) via gas inlet 202. In some embodiments, the gas pressure to push the liquid metal 107 through alloy nozzle 206 is in the range of 5-6 atmospheres or 70-90 psi. In some embodiments, the frequency of pressure pulsing may be in the tens, hundreds, or thousands of Hz.

Alloy nozzle 206 design includes a custom alloy, for example, Tungsten. Since it has been shown that no simple ceramic or refractory metal can withstand dissolution in molten titanium, a custom engineered tungsten alloy (such as a tungsten-titanium alloy) is proposed for forming alloy nozzle 206, which alloy is expected to meet the system requirements. An embodiment of alloy nozzle 206 is shown schematically in FIGS. 3A-3B discussed below.

Figure 3A:
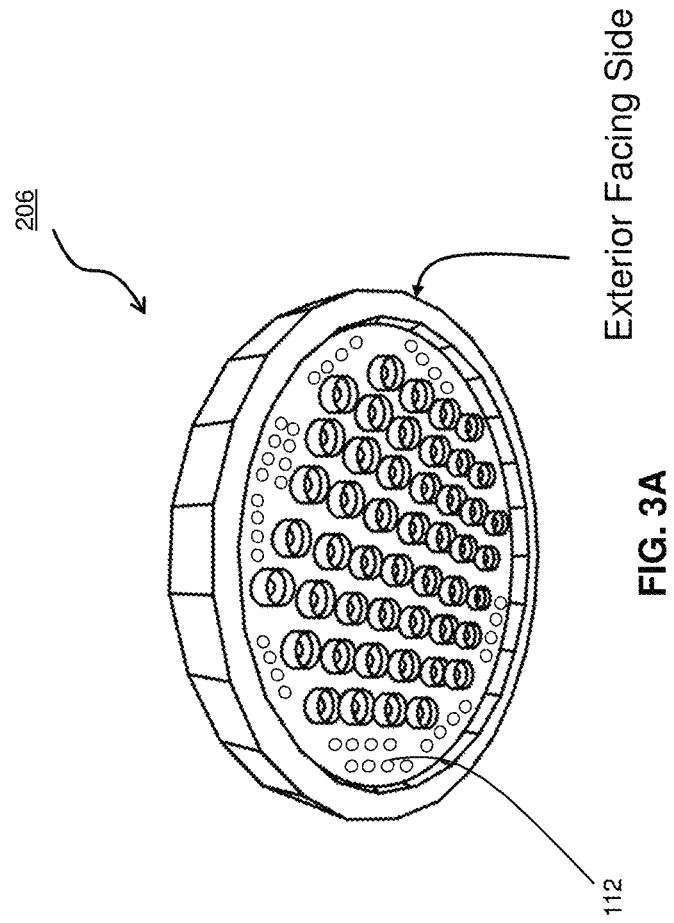
FIGS. 3A & 3B are schematic representations of an alloy nozzle for use in singulated liquid metal droplet generator system, in accordance with one or more embodiments of the present invention.
Figure 3B:
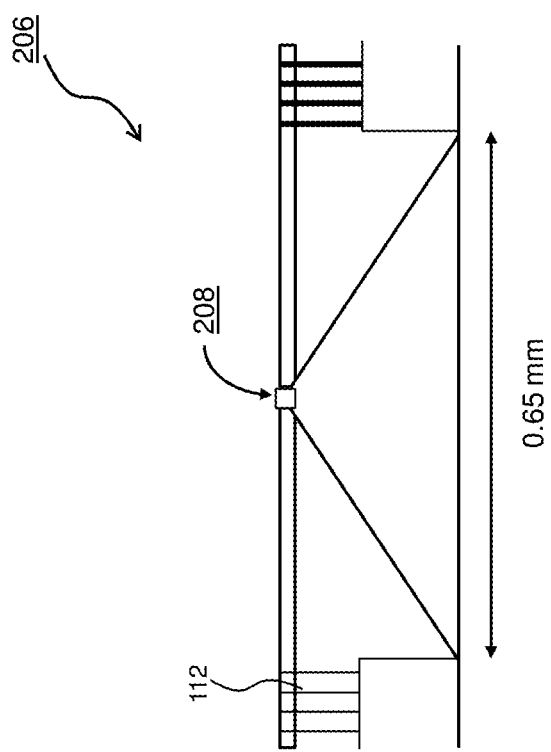

Referring now to FIGS. 3A-3B in conjunction with FIG. 2; FIG. 3A shows a perspective view of the exterior side of alloy nozzle 206 (side away from the liquid metal sphere). FIG. 3B shows a vertical cross-section of one of the droplet forming nozzles, with small apertures on either side for the flow of Ar gas, via gas flow channels 112. In some embodiments, alloy nozzle 206 includes one or more gas flow channels 112 configured to assist in levitation of the mass of molten metal 207 by facilitating a back pressure of Argon gas flow.

In some embodiments, gas flow channels 112 are interspaced with holes 108, as shown in FIG. 3A for example. In some embodiment gas flow channels are position as close to the holes as possible, for example, near the outward edges of alloy nozzle 206, as shown in FIG. 3B. Gas flow channels 112 are fabricated sufficiently smaller than holes 108 so that gas flow channels 112 are not inundated with molten metal alloy 207. Generally speaking, gas flow channels have diameters sufficiently smaller than holes 108 holes so that channels 112 are not inundated with molten metal during droplet formation and release. Even though channels 112 are flush with holes 108 on the interior facing portion of the nozzle gas flow 112 nozzles may be off when molten metal 207 engages nozzle 206. This is due to the high surface tension and low wettability of molten metals corresponding to titanium alloys.

In some embodiments, when the liquid molten metal 207 engages with alloy nozzle 206 during the formation and release of singulated metal droplets, gas flow channels 112 are turned on. In other embodiments, during the formation of singulated metal droplets, gas flow channels 112 are turned off. For example, molten metal 207 may correspond to a metal alloy having high wettability and low surface tension. In this case, molten metal 207 may "leak" into gas flow channels 112 if the gas flow channels are not "on" during droplet formation. Accordingly, in some embodiments, gas flow channels remain operational (i.e., provide a back pressure of Ar gas flow) during droplet formation (i.e., when molten metal 207 engages with alloy nozzle 206) based on the wettability and surface tension of the particular liquid metal alloy.

In some embodiments, when a liquid metal alloy is used having low wettability and high surface tension, (e.g., Ti alloys), gas flow channels 112 are not operational (i.e., "off"), as there is no "leakage" into gas flow channels 112 due to high surface tension and low wettability of molten metal 207. For example, Titanium alloys have low wettability and high surface tension and therefore there is little likelihood that gas flow channels will be inundated by molten metal 207 when engaged with alloy nozzle 206. Accordingly, in some embodiments, when the metal alloy 207 corresponds to an alloy having high wettability and low surface tensions, gas flow channels will remain operational in order to prevent inundating gas flow channels with molten metal 207.

In FIG. 3B, the liquid mass of molten metal 207 is pushed into the top of alloy nozzle 206 entry inlet structure as shown by argon gas pulse 205 so as to form one or more droplets 209 which are released from the bottom of alloy nozzle 206 exit outlet structure; note the small, roughly 100 micron diameter opening at the top entry inlet of alloy nozzle 205 and the flared opening at the bottom exit outlet which widens out to a diameter of roughly 0.65 mm.

In one embodiment, when causing fluid laminar flow through alloy nozzle 205 and/or while releasing the singulated liquid metal droplet, the metal droplet is continuously levitating. Stated another way, when causing fluid laminar flow through alloy nozzle 205 and/or while releasing singulated liquid metal droplets, at least a portion of the levitating mass of molten metal engages with the alloy nozzle, while no portion of the levitation mass of molten metal comes into contact with the crucible housing.

In another embodiment, the liquid mass of molten metal may not always be fully levitating during the fluid laminar flow through alloy nozzle 205 and/or while releasing the singulated liquid metal droplet. Stated another way, when causing fluid laminar flow through alloy nozzle 205 and/or while releasing the singulated liquid metal droplet at least a portion of the levitating mass of molten metal engages with the alloy nozzle, while some of the levitating mass of molten metal comes into contact with the crucible housing. As used herein engages means there is surface contact between the parts.

In some embodiments, metal alloys including Zinc, Aluminum, and other metals having lower melting points need not be levitated prior to droplet formation. For example, when lower melting point metal alloys are utilized, a suitable inert nozzle may be utilized without damaging the nozzle. When melting points are low enough to not cause damage to an inert nozzle, the low melting point alloys may be melted without levitating the molten metal alloy, and the same pressure pulse of inert Ar gas may be utilized for singulated droplet generation.

As shown in FIG. 3B, alloy nozzle 206 includes one or more gas flow channels 112 configured to assist in levitation of the mass of molten metal. In some embodiments, nozzle 206 is approximately 500 microns thick and is arrayed with 5-10 micron holes (i.e., gas flow channels 112) for allowing Ar gas to pass through and assist the electromagnetic levitation in preventing liquid metal from making contact with the alloy surface, except for during droplet formation. Within this 5-10 micron array are approximately 50 holes of 100 microns diameter through which the molten titanium or other metal droplets can be released. In some embodiments, there is some contact between the liquid metal and the copper crucible during droplet formation. In other embodiments, there is no contact between liquid metal and the copper crucible during droplet formation.

In addition to the diameter of the holes, the final droplet size is a function of the temperature, viscosity and surface tension of the molten metal, and the pressure applied to release the droplets. Accordingly, it is expected that these parameters while generally will be in the range described above for materials such as titanium alloys, may be adjusted based on experimental observations of the final spherical powder size. Alloy nozzle 206 structure will be manufactured by state of the art micro electro mechanical systems (MEMS) processes using the custom tungsten alloy as the base. The holes in the tungsten nozzle can be manufactured by conventional micromachining techniques such as micro electrical discharge machining, deep reactive ion etching and/or wet etching using lithographically printed etch masks.

Figure 4:
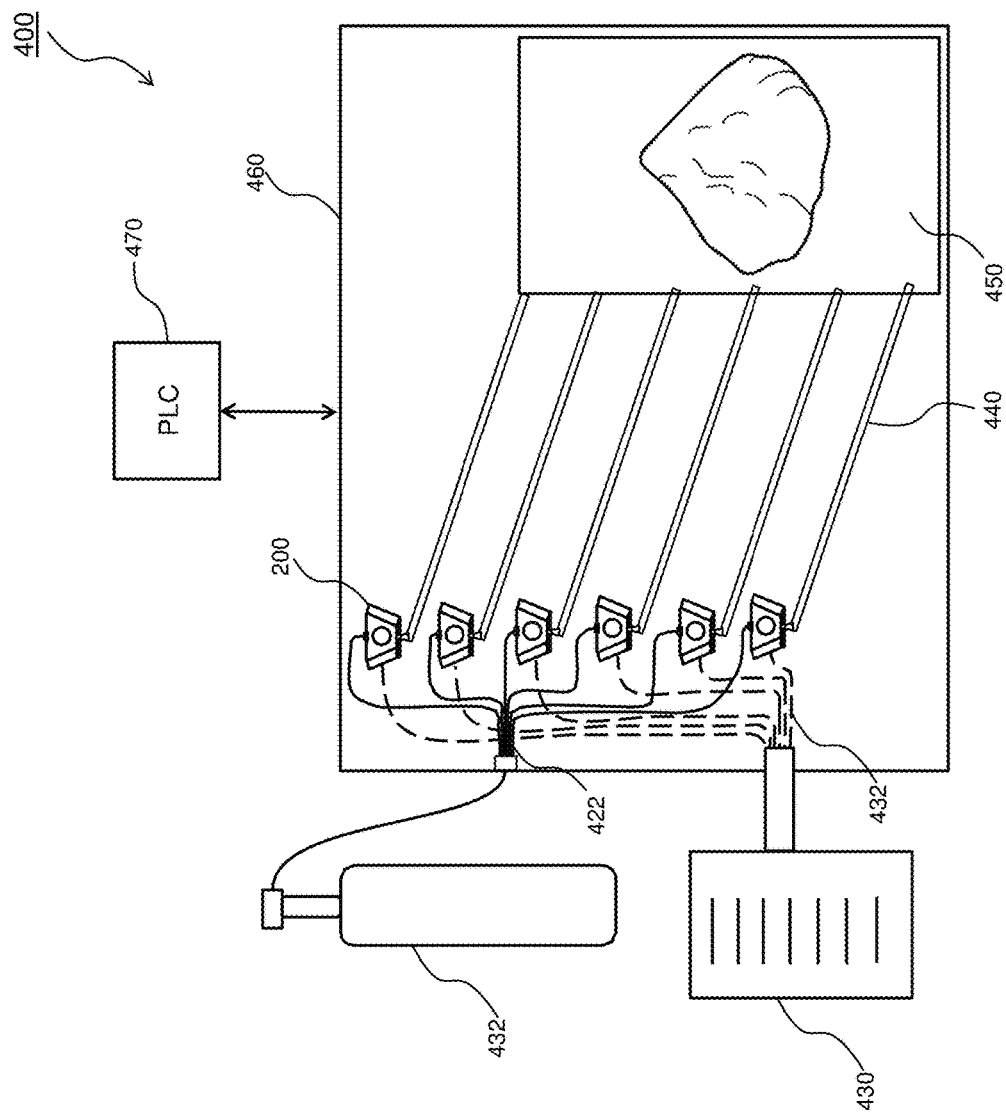
FIG. 4 is a schematic representation of an exemplary metal alloy powder production system, in accordance with one or more embodiments of the present invention.

Referring now to FIG. 4, in conjunction with FIGS. 1-3, FIG. 4 illustrates an exemplary system 400 for generating singulated metal alloy droplets and collecting metal powder. System 400 is provided with centralized argon gas distribution and an induction power supply unit for controlling the heating of all of the crucibles 200. As shown in FIG. 4, system 400 includes crucibles 200, gas supply 420 having supply lines 422, inductive power supply 430 having coils 432 (shown by the dashed lines in FIG. 4), cooling and collection channels 440, powder collection unit 450, chamber 460, and programmable logic controller (PLC) 470. Supply lines 422 may include one or more solenoid valves (not shown) for controlling gas pulses.

In some embodiments, argon filled chamber 460 houses crucibles 200, channels 440 and powder collection unit 550 and is coupled to gas and power supply 420,430. Chamber 460 facilitates an inert environment free from errant particle pollution. A feeding mechanism (not shown) may be configured for placing compacted pieces of metal wire into crucibles 200.

In some embodiments, PLC 470 is used to control the methods and processes described herein. PLC 470 may include one or more communication transceivers, memory devices, processors, field programmable gate arrays (FPGAs), and the like. PLC 470 may include memory containing firmware for executing on or more operations via one or more processers as described herein. PLC 470 may be in communication with one or more actuators of power and gas supply 420, 430 for controlling processes corresponding to the embodiments described herein.

In some embodiments, the starting material for generation of metal alloy droplets is, for example, a low cost wire of Ti-6-4 alloy, with a wire diameter up to 3 mm. The wire is cut, for example, into 157-314 cm sections (weighing roughly 50-100 g each, or up to 500 g each in other embodiments) and is compacted by coiling it around a ceramic spindle roughly one inch (2.54 cm) in diameter, which will result in an approximately 60 mm×25.4 mm diameter unit of feedstock. Other methods of compaction can be used as long as the dimensions are similar to what is described above. Once compacted, the 50-500 grams of compacted Ti-6-4 alloy is electromagnetically levitated by an electric field generated by inductive power supply 430.

In some embodiments, coils 432 are operatively coupled to, and configured for inductively heating, crucible 200. For example, power supply 430 may include a primary transformer (not shown) configured to output an alternating electrical current via coils 432, thereby generating an alternating magnetic field within crucible 200. For example, coils 432 may be coupled to a solid state RF power supply (430) that operates to send an AC current through an inductor (e.g., coil 422), and the crucible 200 is placed inside (i.e., operatively coupled) to coils 432 as a short-circuit secondary. Due to the forces of Faraday's Law, when coils 432 (i.e., secondary transformer) are located within the magnetic field, an electric current will be induced.

By including metal crucible 200 placed within the inductor coils 432, crucible 200 is encompassed by a magnetic field; circulating eddy currents (not shown) are induced within the crucible housing (e.g. 204). These eddy currents flow against the electrical resistivity of the metal of crucible 200, generating precise and localized heat without any direct contact between the crucible 200 and inductor coils 432. This heating occurs with both magnetic and non-magnetic parts, and is often referred to as the "Joule effect", referring to Joule's first law—a scientific formula expressing the relationship between heat produced by electrical current passed through a conductor. Additional heat is produced within magnetic parts through hysteresis—internal friction that is created when magnetic parts pass through the inductor. Magnetic materials naturally offer electrical resistance to the rapidly changing magnetic fields within the inductor. This resistance produces internal friction which in turn produces heat.

In the process of heating the metal (e.g., Ti-6-4), there is therefore no contact between the inductor and crucible 200, and neither are there any combustion gases. In some embodiments, crucible 200 to be heated can be located in a setting isolated from the power supply; submerged in a liquid, covered by isolated substances, in gaseous atmospheres or even in a vacuum.

After the levitating metal is molten a gas pulse 206 pushes the levitating mass of molten metal 207 onto alloy nozzle 208, and precisely sized liquid droplets of alloy metal are ejected from nozzle 208. Once the liquid droplets are ejected, the droplets are allowed to cool slowly before being collected and transported to powder storage unit 450. In some embodiments, logic controller 470 is in communication with the cooling channels and configured to adjust the distance the metal alloy droplets drop. Since the droplets are of a precise size, there is no need to bin or sieve the powder. This is schematically shown in FIG. 4 (showing 6 crucibles 200 for one embodiment). The targeted output for system 400 can be several kg/hour depending on the target powder size and alloy nozzle configuration used (e.g., bimodal, trimodal, etc.). This is based on some embodiments having simultaneous generation of liquid metal from up to 20 crucible 450 generating 50 droplets per pressure pulse of 100 micron diameter titanium alloy powder at a minimum rate of 300 Hz.

Referring now to Table 1, shown below, Table 1 depicts the estimation of the throughput for 100 micron and 50 micron size droplets for a frequency of 300 Hz and 50 holes per nozzle and 20 crucibles operating in parallel. The system conceived here is similar to the system shown schematically in FIG. 1.

TABLE 1

| Throughput Estimate | | | |
| --- | --- | --- | --- |
| Droplet size | 100 | 50 | microns |
| Number of holes per crucible | 50 | 50 | |
| Density | 4.5 | 4.5 | g/cm3 |
| Number of crucibles/system | 20 | 20 | |
| Pulsing frequency | 0.3 | 0.3 | kHz |
| Output per hour per system | 20.36 | 2.54 | kg/hour |

Figure 5:
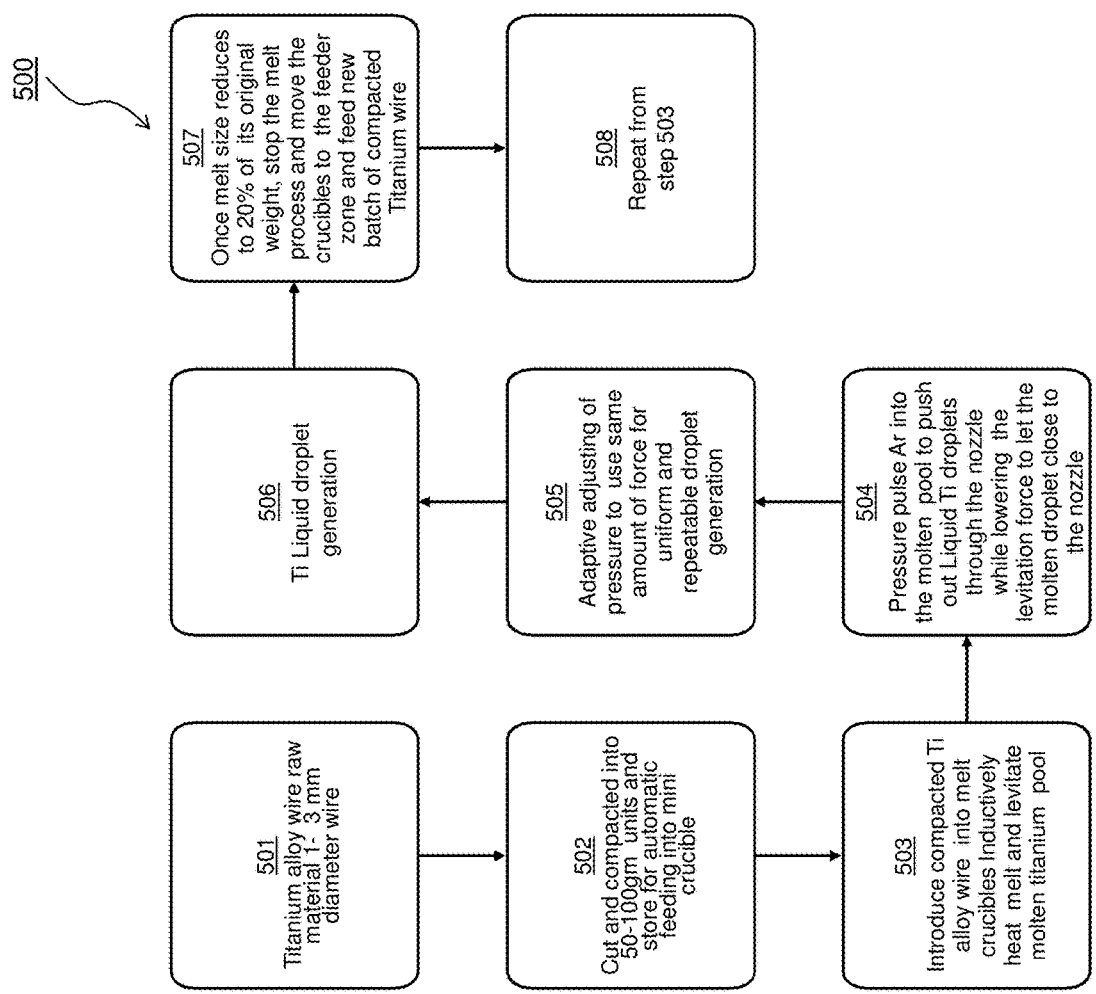
FIG. 5 is an exemplary method for making Ti metal alloy powder utilizing a singulated liquid metal droplet generator system, in accordance with one or more embodiments of the present invention.

Referring now to FIG. 5; FIG. 5 shows a method process flow 500 according to some embodiments of the present invention for the manufacture of additive metal and/or titanium alloy powder. One or more of these steps will be controlled by a state-of-the-art programmable logic controller (e.g., PLC 470). In some embodiments, PLC 470 may be configured to synchronize Ar pressure pulsing with the decreasing of electromagnetic fields used for levitation to enable laminar flow of liquid passing through alloy nozzle 206 to form droplets. For example, PLC 470 may include logic for synchronizing Ar pressure pulsing with a lower induction current causing weaker electromagnetic fields used for levitation of the molten metal thereby enabling a laminar flow of liquid passing through the alloy nozzle to form one or more droplets. The process may include steps 501-508 as described below, which are described for the example of titanium alloy droplet formation.

At an operation 501, pure metal or alloy wire is cut and compacted as part of the feeding mechanism into crucibles 200. The typical weight is 50 g but can be as high as 100 g. This is done automatically by a pick and place feeder mechanism system from a bin which stores the 50-100 g pellets of compacted Ti alloy wire.

At an operation 502, once the pellets are in place, the system 400 via PLC 470 triggers induction power supply 430 heaters and heat is generated via coils 432 in crucibles 200. Crucibles 200 are water cooled via cooling channels 210.

At an operation 503, once the temperature is high enough and the Ti alloy is molten and is levitating, an Ar pressure solenoid (e.g., 422) is activated to produce periodic pressure pulses which push the droplets through alloy nozzle 206. At an operation 504, the liquid metal droplets are allowed to fall by gravity a short distance to assume a spherical shape and to cool down enough to solidify into Ti alloy spheres.

At an operation 505, the solidified powder particles are collected on an argon cushion over a collection chute and then into a powder collection unit, using for example, a gravity driven process. The spherical metal particles can levitate on the Argon cushion (much like an air hockey puck on an air cushioned table) and while doing so get cooled down enough to be transferred to the collection bin. At an operation 506, once the melt is depleted to less than 20%, for example, of its original amount, a fresh batch of Ti alloy pellets is brought in to be dropped into the crucibles and the process is repeated from step 502.

In some embodiments, implementation of the methods described herein are applied to Inconel, Hastealloy and other similar alloys. While the discussion above make precisely sized powders of Ti-6-4, the approach applies equally to the manufacture of other high temperature alloys such as Inconel 718 (e.g., Ni 52.5, Cr 19.0 Fe 18.5 Mo 3.0 Nb+Ta 3.6), Hastealloy (e.g., Ni 47.1, Cr 21.8, Fe 18.5, Mo 9.0, Mn 1.00, C 0.1, Si 1.00, S 0.03, Co 1.5, W 0.6) or Monel (e.g., Ni 66.5 Cu 31 Fe 2.5 Mn 2.0 C 0.3 Si 0.5 S 0.024) and other Nickel based superalloys. Since these have melting temperatures below 1500 C, the approach of using a Tungsten alloy for alloy nozzle 206 is highly adoptable to other high temperature alloys as well. In some embodiments, various nozzle materials suitable for the particular application may be determined by those having ordinary skill in the art and have been fully contemplated herein.

The embodiments described above may be utilized to manufacture custom alloys, for example, Nitinol that need to be made in small quantities. As discussed above, Nitnol is approximately 51% Ni-49% Ti. Nitnol is highly in demand due to its highly desirable property of shape memory. Nitnol is also increasingly required in medical applications such as stents. Nitnol's mechanical properties (e.g., compatibility with the porous human bone structure) are useful for porous orthopedic implants.

For example, the small crucible approach via process flow 500 discussed above may be utilized for measuring precise amounts of Nickel and Titanium as feed wires and then inductively melting and levitating small amounts (less than 100 grams) of this material. Flow 500 can manufacture low cost, precisely sized, high purity Nitinol speherical powder, which is especially useful for emerging 3D printing applications. Having such small quantities will enable full miscibility of the individual elements to form the Nitinol Alloy without the danger of contamination or Nickel and Titanium precipitation.

Although the present invention has been particularly described with reference to the preferred embodiments thereof, it should be readily apparent to those of ordinary skill in the art that changes and modifications in the form and details may be made without departing from the spirit and scope of the exemplary embodiments described herein. It is intended that the appended claims encompass such changes and modifications. In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the description provided above provides detail for the purpose of illustration based on what is currently considered to be the most practical embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed:

1. A crucible apparatus for generating singulated liquid metal droplets, the apparatus comprising:
   a crucible housing operationally coupled to a plurality of coils configured to generate heat to provide induction heating of the crucible housing and electromagnetically levitate a mass of molten metal;
   a gas inlet configured to receive a pressurized gas pulse, the pressurized gas pulse being directed at the mass of molten metal; and
   an alloy nozzle configured to release a singulated liquid metal droplet singulated from the mass of molten level due to the pressurized gas pulse directed at the mass of molten metal, wherein the alloy nozzle includes one or more gas flow channels configured to assist in levitation of the mass of molten metal.

2. The crucible apparatus of claim 1, wherein the alloy nozzle includes a tungsten alloy.

3. The crucible apparatus of claim 1, wherein the alloy nozzle includes one or more of Inconel 718, Hastealloy or Monel.

4. The crucible apparatus of claim 1, wherein the crucible is operatively coupled to coils for generating a magnetic field encompassing the crucible housing.

5. The crucible apparatus of claim 1, wherein the alloy nozzle includes an entry inlet having a diameter in the range of 10 to 200 micro meters.

6. The crucible apparatus of claim 5, wherein the entry inlet provides for bimodal distribution.

7. The crucible apparatus of claim 5, wherein the entry inlet provides for trimodal distribution.

8. The crucible apparatus of claim 1, wherein the alloy nozzle includes an exit outlet having a diameter of 0.65 mm.

9. The crucible apparatus of claim 1, wherein the alloy nozzle includes an exit outlet having a diameter of range of 0.20 to 0.80 mm.

10. The crucible apparatus of claim 1, wherein the pressured gas pulse is an Ar pulse, and a logic controller is configured to synchronize Ar pressure pulsing and lower electromagnetic fields used for levitation thereby enabling a laminar flow of liquid passing through the alloy nozzle to form one or more droplets.

11. The crucible apparatus of claim 1, wherein the alloy nozzle is positioned to provide for the levitating mass of molten metal to engage with the alloy nozzle.

12. The crucible apparatus of claim 1, wherein when releasing the singulated liquid metal droplet, the alloy nozzle is positioned to provide for at least a portion of the levitating mass of molten metal to engage with the alloy nozzle while no portion of the levitation mass of molten metal engages with the crucible housing.

13. The crucible apparatus of claim 1, wherein when releasing the singulated liquid metal droplet, the alloy nozzle and the crucible housing are positioned to provide for at least a first portion of the levitating mass of molten metal engages with the alloy nozzle while at least a second portion of the levitation mass of molten metal engages with the crucible housing.

14. A method for generating singulated liquid metal droplets utilizing a crucible having a gas inlet, a plurality of coils, and an alloy nozzle, the method comprising:
providing a mass of metal wire into the crucible;
inductively heating, utilizing the plurality of coils, the crucible thereby melting the mass of metal wire and electromagnetically levitating the mass of molten metal; and
providing a pressurized gas pulse into the mass of molten metal via a gas inlet of the crucible and simultaneously lowering the levitation force thereby pushing out a singulated liquid metal droplet from the alloy nozzle, wherein the alloy nozzle includes one or more gas flow channels configured to assist in levitation of the mass of molten metal.

15. The method of claim 14 further comprising, adaptively adjusting the pressure and the levitation force thereby producing uniform singulated droplets.

16. The method of claim 14, wherein providing the pressurized gas pulse comprises synchronizing Ar pressure pulsing with a lower induction current causing weaker electromagnetic fields used for levitation of the molten metal thereby enabling a laminar flow of liquid passing through the alloy nozzle to form one or more droplets.

17. The method of claim 14, wherein the alloy nozzle includes an entry inlet having a diameter in the range of 10 to 200 micro meters.

18. The method of claim 17, wherein the entry inlet provides for bimodal distribution.

19. The method of claim 17, wherein the entry inlet provides for trimodal distribution.

20. The method of claim 14, wherein the alloy nozzle includes an exit outlet having a diameter of 65 mm.

21. The method of claim 14, wherein a logic controller is configured to synchronize Ar pressure pulsing and lower electromagnetic fields used for levitation thereby enabling a laminar flow of liquid passing through the alloy nozzle to form one or more droplets.

22. A system for generating singulated metal droplets and collecting powder metal, the system comprising:
one or more crucible apparatus comprising:
a crucible housing operatively coupled to induction heating coils configured to generate heat to provide induction heating of the crucible housing and electromagnetically levitate a mass of molten metal;
a gas inlet configured to receive a pressurized gas pulse, the pressurized gas pulse being directed at the mass of molten metal; and
an alloy nozzle configured to release a singulated liquid metal droplet singulated from the mass of molten metal due to the pressurized gas pulse directed at the mass of molten metal, wherein the alloy nozzle includes one or more gas flow channels configured to assist in levitation of the mass of molten metal;
an induction power supply coupled to the induction heating element configured to supply power for inductive heating;
a gas supply configured to provide a pressurized gas from the pressurized gas pulse;
a gas chamber including the one or more crucibles apparatus;
one or more dispensing channels that each correspond to the one or more crucible apparatus, wherein each of the one of more dispensing channels receive powder from one of the one or more crucible apparatus; and
a powder collection unit configured to collect powder from the dispensing channel, the powder corresponding to a singulated liquid metal droplet.

23. The system of claim 22, wherein the alloy nozzle includes a tungsten alloy.

24. The system of claim 22, wherein the alloy nozzle includes one or more of Inconel 718, Hastealloy, or Monel.

25. The system of claim 22, further including a logic controller, and wherein, based on a wettability and a surface tension of the molten mass of metal, the logic controller causes the one or more gas flow channels to remain on when the molten mass metal engages with the alloy nozzle.

26. The system of claim 22, wherein the alloy nozzle includes an entry inlet having a diameter in the range of 10 to 200 micro meters.

27. The system of claim 26, wherein the entry inlet provides for bimodal distribution.

28. The system of claim 26, wherein the entry inlet provides for trimodal distribution.

29. The system of claim 22, wherein the alloy nozzle includes an exit outlet having a diameter of 0.65 mm.

30. The system of claim 22, wherein the pressured gas pulse is an Ar pulse, and a logic controller is in communication with the inductive heating power supply, the gas supply, and the cooling channels and is configured to synchronize Ar pressure pulsing and lower electromagnetic fields used for levitation thereby enabling a laminar flow of liquid passing through the alloy nozzle to form droplets.

31. The system of claim 22, further including cooling channels and wherein a logic controller is in communication with the inductive the cooling channels and configured to adjust a distance the metal alloy droplets drop.

* * * * *